United States Patent
Su

(10) Patent No.: US 9,497,416 B2
(45) Date of Patent: *Nov. 15, 2016

(54) VIRTUAL CIRCULAR CONFERENCING EXPERIENCE USING UNIFIED COMMUNICATION TECHNOLOGY

(71) Applicant: Microsoft Technology Licensing, LLC, Redmond, WA (US)

(72) Inventor: Jinyan Su, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/709,660

(22) Filed: May 12, 2015

(65) Prior Publication Data

US 2015/0244986 A1 Aug. 27, 2015

Related U.S. Application Data

(63) Continuation of application No. 12/970,834, filed on Dec. 16, 2010, now Pat. No. 9,055,189.

(51) Int. Cl.
| | |
|---|---|
| *H04N 7/14* | (2006.01) |
| *H04N 7/15* | (2006.01) |
| *G06F 3/01* | (2006.01) |
| *H04L 12/18* | (2006.01) |
| *G06T 3/40* | (2006.01) |
| *H04N 5/232* | (2006.01) |

(52) U.S. Cl.
CPC ...... *H04N 7/15* (2013.01); *G06F 3/01* (2013.01); *G06T 3/40* (2013.01); *H04L 12/1827* (2013.01); *H04N 5/23238* (2013.01); *H04N 7/147* (2013.01)

(58) Field of Classification Search
CPC .................................................. H04N 7/15
USPC ......... 348/14.01, 14.07, 14.08, 14.09, 14.11, 348/14.1, 211.12
See application file for complete search history.

(56) References Cited

U.S. PATENT DOCUMENTS

| | | | |
|---|---|---|---|
| 7,528,860 | B2 | 5/2009 | Harville et al. |
| 7,634,533 | B2 | 12/2009 | Rudolph et al. |

(Continued)

OTHER PUBLICATIONS

"FlyCam: Practical Panoramic Video", <http://www.fxpal.com/?p=flycam>, Mar. 17, 2004, 3 pages, (author unknown).

(Continued)

*Primary Examiner* — Yosef K Laekemariam
(74) *Attorney, Agent, or Firm* — Monica Adjemian; Sudhanshu Sohoni; Micky Minhas

(57) ABSTRACT

A virtual circular conferencing experience using unified communication technology is described. An apparatus may comprise a communications module operative to receive a plurality of incoming video streams from corresponding client devices for a conference call, a multimedia controller operative to retrieve video information of participants from each of the incoming video streams and generate a seamless virtual circular video stream from the video information comprising a virtual circular image having a composite of participants in a virtual room, and a communications module operative to broadcast the seamless virtual circular video stream to the client devices. Other embodiments are described and claimed.

20 Claims, 6 Drawing Sheets

(56) References Cited

U.S. PATENT DOCUMENTS

| | | |
|---|---|---|
| 8,355,041 B2 | 1/2013 | Chen et al. |
| 8,432,431 B2 * | 4/2013 | Gorzynski ............... H04N 7/15 348/14.07 |
| 2005/0185047 A1 | 8/2005 | Hii |
| 2009/0046139 A1 | 2/2009 | Cutler et al. |
| 2009/0244257 A1 | 10/2009 | MacDonald et al. |
| 2010/0073454 A1 | 3/2010 | Lovhaugen et al. |
| 2010/0128105 A1 | 5/2010 | Halavy |
| 2010/0157017 A1 | 6/2010 | Pepperell |

OTHER PUBLICATIONS

"Radvision Announces Most Interoperable, Multi-Vendor, Multi-Stream Telepresence", <http://ww.radvision.com/Corporate/PressCenter/2010/2Jun2010_telepresence.htm>, Jun. 2, 2010, 2 pages, (author unknown).

"Telepresence Video Conferencing", <http://www.cisco.com/cisco/web/UK/solutions/en/video_conferencing/index.html>, Aug. 10, 2010, 1 page, (author unknown).

* cited by examiner

VIRTUAL CIRCULAR CONFERENCING EXPERIENCE USING UNIFIED COMMUNICATION TECHNOLOGY

CROSS-REFERENCE TO RELATED APPLICATION

This application is continuation of and claims priority to U.S. patent application Ser. No. 12/970,834 entitled "Virtual Circular Conferencing Experience Using Unified Communication Technology," filed on Dec. 16, 2010, the subject matter of which is hereby incorporated by reference in its entirety.

BACKGROUND

As Internet bandwidth has improved, online conferencing has grown in popularity. Online conferencing allows geographically distant people to communicate more naturally, empowering a simulation of face-to-face communication, than previous long-distance communication solutions like the telephone, e-mail, or instant messaging. However, as will become more evident, existing tools for creating an online conference are limited in the degree to which they are able to reproduce the experience of a face-to-face meeting. It is with respect to these and other considerations that the present improvements have been needed.

SUMMARY

This Summary is provided to introduce concepts concerning a virtual circular conferencing experience which is further described below in the Detailed Description. This Summary is not intended to identify key features or essential features of the claimed subject matter, nor is it intended to be used as an aid in determining the scope of the claimed subject matter.

Various embodiments are generally directed to techniques for creating and displaying a seamless virtual circular video stream. Some embodiments are particularly directed to a conferencing system implementing various techniques for creating and displaying a seamless virtual circular video stream. In one embodiment, for example, the conferencing system may receive a plurality of incoming video streams, combine them into an outgoing video stream, and broadcast the outgoing video stream. At least one of the incoming video streams may be a panoramic video stream, which may comprise an approximately 360-degree video stream of a conference room. The panoramic video stream may be divided into a plurality of sub-streams, which may be combined with the remaining incoming video streams into the outgoing video stream. In some embodiments, the panoramic video stream may be divided on the basis of identified participants in the panoramic video stream. Participants from the video streams may be composited into a virtual room, may be resized to a similar size in the virtual room, and the outgoing video stream may be a seamless virtual circular video stream.

Some embodiments are particularly directed to a conferencing client. In one embodiment, for example, the conferencing client may receive a seamless virtual circular video stream and display the stream as a virtual circular image. The conferencing client may send an outgoing video stream and the received seamless virtual circular video stream may contain a portion of the outgoing video stream. The conferencing client may display the virtual circular image with a starting and ending degree determined by the client, and may be operative to pan and zoom various aspects of the virtual circular image.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Figure 1:
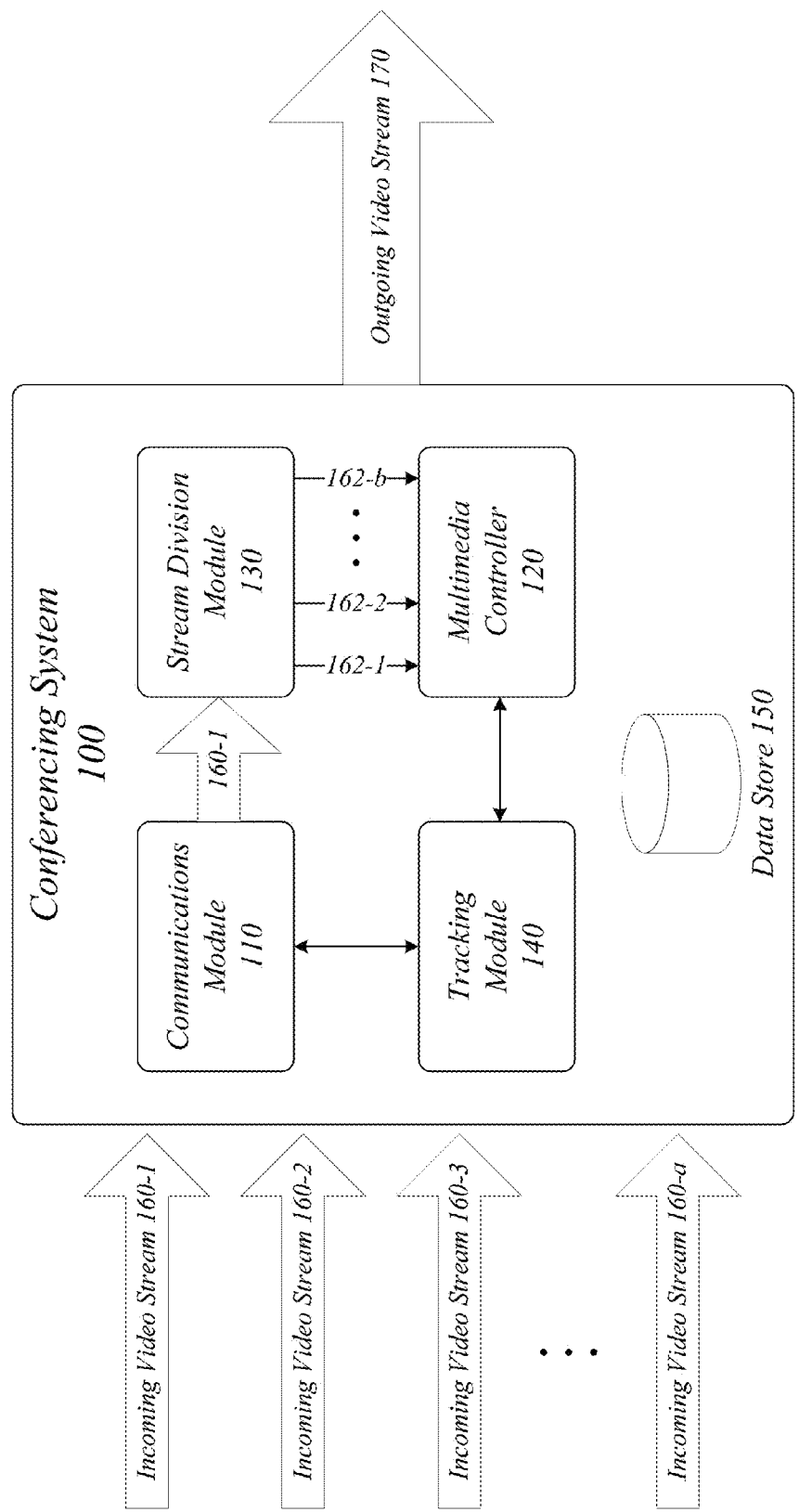
FIG. 1 depicts an exemplary block diagram of a conferencing system designed for providing a virtual circular conferencing experience.

Online conferencing has become a popular tool for use in both personal and business environments. Increasing bandwidth has increased the availability and decreased the cost of holding an online conference. Business and social networks are able to decrease the impact of geographic separation by simulating the face-to-face contact that traditionally occurs in work and social relationships.

However, conventional techniques are limited in the degree to which they are able to provide a convincing simulation of face-to-face conferencing and significant improvements are needed. For instance, if a participant is in a conference with other participants in multiple locations, conventional techniques may not be equipped to provide an adequate simulation of the participants being in a unified group meeting in a single location. Existing tools for online conferencing tend to present individual video streams for each participating location as separate images, which may have the effect of emphasizing the geographical separation of the participants, and thereby decreasing the efficiency and camaraderie of a meeting.

To solve these and other problems, various embodiments are directed towards techniques designed to enhance an online conferencing experience. An online conferencing experience may be created in which each participant appears as part of a unified conference. For instance, a conference system may combine together a plurality of video streams received from participants into a unified outgoing video stream. This outgoing video stream may provide the simulation that the participants are all located in the same place. This may be accomplished by creating a virtual room, such as a virtual conference room. The video streams of the participants may be combined together into the virtual room so as to create the appearance that the participants are all located together in the virtual room. In the example of a virtual conference room, this may take the form of extracting a portion of each video stream corresponding to a portrait of a participant, and compositing the plurality of video portraits around a virtual conference table placed within the virtual conference room so as to create the appearance that the conference participants are seated around the virtual conference table. Such compositing operations may create an illusion that these video portraits are moving and speaking in a shared spaced. As such, the online conference may better simulate the experience of a face-to-face meeting.

Reference will now be made in detail to embodiments of the present technology for a virtual circular conferencing experience, examples of which are illustrated in the accompanying drawings. While the technology for the virtual circular conferencing experience will be described in conjunction with various embodiments, it will be understood that they are not intended to limit the present technology for a virtual circular conferencing experience to these embodiments. On the contrary, the presented technology for a virtual circular conferencing experience is intended to cover alternatives, modifications and equivalents, which may be included within the spirit and scope the various embodiments as defined by the appended claims. Furthermore, in the following detailed description, numerous specific details are set forth in order to provide a thorough understanding of the present technology for a virtual circular conferencing experience. However, the present technology for a virtual circular conferencing experience may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present detailed description, discussions utilizing terms such as "receiving", "sending", "broadcasting", "dividing", "combining", "identifying", "compositing", "resizing", "determining", "displaying", "panning", "zooming", "specifying", "defining", "representing", or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present technology for a virtual circular conferencing experience is also well suited to the use of other computer systems such as, for example, optical and mechanical computers. Additionally, it should be understood that in embodiments of the present technology for a virtual circular conferencing experience, one or more operations can be performed manually.

FIG. 1 depicts an exemplary block diagram of a conferencing system 100 designed for providing a virtual circular conferencing experience. In the illustrated embodiment shown in FIG. 1, the conferencing system 100 includes a communications module 110, a multimedia controller 120, a stream division module 130, a tracking module 140, and a data store 150. The communications module 110 is generally operative to receive a plurality of incoming video streams. The multimedia controller 120 is generally operative to combine the incoming video streams into an outgoing video stream. The stream division module 130 is generally operative to divide a panoramic video stream into a plurality of video sub-streams so that the multimedia controller might combine the resulting video sub-streams and any remaining incoming video streams besides the divided panoramic video stream, into the outgoing video stream. The tracking module 140 is generally operative to identify participants in a panoramic video stream so that the stream division module might divide the panoramic video stream on the basis of the identified participants. The data store 150 is generally operative to store any data necessary for the operation of the conferencing system.

In various embodiments, the communications module 110 may be arranged with various communication interfaces capable of receiving incoming video streams 160-$a$ from various client applications or devices. The communications module 110 may be arranged with various communication interfaces capable of broadcasting an outgoing video stream 170 to one or more client applications or devices.

It is worthy to note that "a" and "b" and "c" and similar designators as used herein are intended to be variables representing any positive integer. Thus, for example, if an implementation sets a value for a=5, then a complete set of video streams 160-$a$ may include video streams 160-1, 160-2, 160-3, 160-4 and 160-5. The embodiments are not limited in this context.

In one embodiment, for example, the conferencing system 100 may be implemented by a server or server array hosting a conference service, and the video streams 160 may be received by the server or server array from client devices implementing various conference applications. The video stream 170 may be broadcasted to one or more client devices, which may be the same or different client devices that transmitted the video streams 160. The video streams 160 and 170 may comprise a multi-party conference call in which multiple clients engage in a group conference. The server and client device may communicate over a wired network, a wireless network, or a combination of both. The embodiments are not limited in this context.

In various embodiments, the multimedia controller 120 may be operative to combine the incoming video streams 160-$a$ into an outgoing video stream 170. Combining the incoming video streams 160-$a$ into an outgoing video stream 170 may comprise extracting some or all of the video information from the incoming video streams 160-$a$ and compositing the extracted video information into an outgoing video stream 170 representing a unified video stream. The video information extracted from an incoming video stream 160-$a$ may correspond to the portion of the video stream 160-$a$ that corresponds to an image of one or more participants in the conference. In this manner, an outgoing video stream 170 may be generated which contains all of the video information from the incoming video streams 160-$a$ which corresponds to the participants in the conference, eliminating any of the background, context, or setting of the incoming video streams.

In one embodiment, at least one of the plurality of incoming video streams 160-$a$ may comprise a panoramic video stream. Panoramic images are wide-angle camera images that span up to three hundred and sixty degrees. Panoramic video camera devices are especially useful in a conference room scenario. A single panoramic video camera can capture conference participants over a wide span of the conference room so that a viewer can see most or all of the conference participants simultaneously. A panoramic video camera device that can capture a three hundred and sixty degree view of the conference room can image all conference participants. In some embodiments, the panoramic video stream may comprise an approximately 360-degree video stream of a conference room.

In various embodiments, there may also be an optional stream division module 130. The stream division module 130 may divide a video stream 160-*a* into a plurality of video sub-streams 162-*b*. The stream division module 130 may divide the video stream 160-*a* so as to isolate or extract certain portions of the video information of the video stream 160-*a*. The video information extracted from the video stream 160-*a* may correspond to a portion or portions of the video stream that corresponds to an image of one or more participants in the multimedia conference. As such, the multiple video sub-streams 162-*b* may comprise a plurality of video streams which each correspond to a single participant in the multimedia conference.

In some embodiments, the video stream 160-*a* to be divided may be a panoramic video stream, as represented by the video stream 160-1. For instance, the video stream 160-1 may comprise a panoramic video stream that is divided to isolate or extract certain portions of the panoramic video stream, which may correspond to the portions of the panoramic video stream that correspond to an image of one or more participants in a conference. In this manner, a panoramic video stream 160-1 may be divided into a plurality of video sub-streams 162-*b*, each of which may correspond to only a single participant of the conference.

In various embodiments, the multimedia controller may be operative to combine multiple video sub-streams 162-*b* into an outgoing video stream 170. This combining may include any remaining incoming video streams 160-*a* which were not divided into video sub-streams 162-*b*. Combining the video sub-streams 162-*b* and the remaining incoming video streams 160-*a* into an outgoing video stream 170 may comprise extracting some or all of the video information from the streams 160-*a*, 162-*b* and compositing the extracted video information into an outgoing video stream 170 as a unified video stream. The video information extracted from a video sub-stream 162-*b* or incoming video stream 160-*a* may correspond to the portion of the stream that corresponds to an image of one or more participants in the conference. In this manner, an outgoing video stream 170 may be generated which contains all of the video information from the streams 160-*a* which corresponds to the participants in the conference, eliminating any of the background, context, or setting of the incoming video streams.

In the example described with reference to FIG. 1, incoming video streams 160-2 and 160-3 may be video streams received from solitary participants, such as participants broadcasting from an office, home office, or other environment in which only a single user participates. Incoming video stream 160-1 may be a panoramic video stream containing video information of multiple participants, such as might be generated by a 360-degree video stream of a conference room containing multiple participants seated around a conference table. The panoramic video stream 160-1 may be divided into a plurality of video sub-streams 162-1, 162-2 and 162-3, each corresponding to one of three (3) participants in a conference room. The outgoing video stream 170 may then be a composited video of portions of the incoming video streams 160-2 and 160-3 and portions of the video sub-streams 162-1, 162-2 and 162-3 generated from the panoramic video stream 160-1. It should be appreciated that more than one incoming video stream 160-*a* may comprise a panoramic video stream, and that each panoramic video stream may be divided into a plurality of video sub-streams 162-*b*, such that all of the pluralities of video sub-streams 162-*b* and remaining incoming video streams 160-*a* may be combined into an outgoing video stream 170.

In various embodiments, there may also be a tracking module 140. The tracking module 140 may identify some or all of the participants in a video stream 160-*a*. It should be appreciated that such identification may be accomplished through a variety of techniques. The tracking module 140 may be operative to identify which portions of a video stream 160-*a* correspond to a person instead of a non-human object or an object that is part of the background of the participants. In some cases, the tracking module 140 may be arranged to recognize faces and to recognize the contour of a face, so as to identify the participant as separate from other objects in the video stream 160-*a*.

In various embodiments, the multimedia controller 120 may composite the participants from the video streams 160-*a*, 162-*b* into a virtual room. A virtual room may comprise a two-dimensional, three-dimensional, or pseudo-three-dimensional virtual space. For example, a two-dimensional background may be created with the appearance of a conference room, against which the participants may be placed. Alternatively, a three-dimensional virtual room may be created, inside of which the participants may be placed. For example, a three-dimensional virtual conference room may be created. Two-dimensional and three-dimensional techniques may be combined to create a pseudo-three-dimensional virtual space, such as a pseudo-three dimensional virtual conference room using a two-dimensional image as a background, but three-dimensional structures for elements representing furniture. The compositing of the participants into the virtual room may involve placing extracted video information of the participants into the virtual room. This compositing may include resizing the video information of the participants to a similar size, which size may be determined by the attributes of the virtual room. This resizing may allow for the creation of a virtual room containing the appearance of participants of a size visually appropriate to the size of the room and the size of the other participants.

In various embodiments, the outgoing video stream 170 may be a seamless virtual circular video stream. A seamless virtual circular video stream may be a video stream of a seamless panoramic view of a virtual room. A seamless panoramic view may be a panoramic view providing a full 360 degrees of visibility, such that no seam appears in a complete circular view of the panorama.

Figure 2:
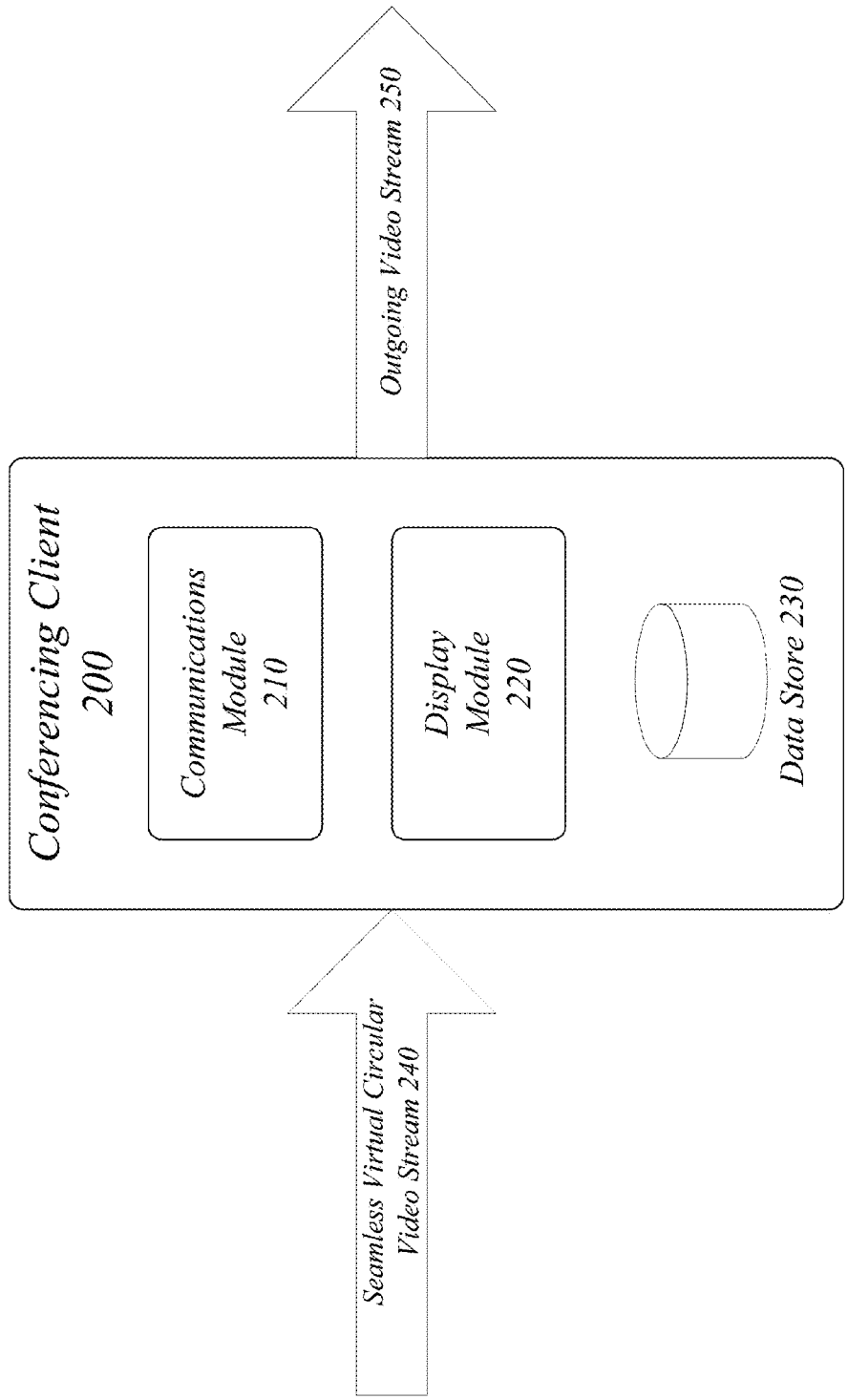
FIG. 2 depicts an exemplary block diagram of a conferencing client designed for participating in a virtual circular conferencing experience.

FIG. 2 depicts an exemplary block diagram of a conferencing client 200 designed for participating in a virtual circular conferencing experience. In the illustrated embodiment shown in FIG. 2, the conferencing client includes a communications module 210, display module 220, and data store 230. The communications module 210 is generally operative to receive a seamless virtual circular video stream 240. The display module 220 is generally operative to display the seamless virtual circular video stream as a virtual circular image. The data store 230 is generally operative to store any data necessary for the operation of the conference client 200.

In various embodiments, the communications module 210 may be arranged with various communication interfaces capable of receiving a seamless virtual circular video stream 240 from a conferencing server. The communications module may be arranged with various communication interfaces capable of broadcasting an outgoing video stream 250 to a conferencing server. The server and client device may communicate over a wired network, a wireless network, or a combination of both. The video streams 240, 250 may comprise a multi-party conference call in which multiple clients engage in a group conference. The embodiments are not limited in this context.

In various embodiments, the communications module 210 may be operative to send an outgoing video stream 250. The outgoing video stream 250 may include video information of a participant in a conference call. The video information may be captured by a video capture device such as a camera. The received seamless virtual circular video stream 240 may contain a portion of the outgoing video stream 250. It should be appreciated that that there may be a delay in time between sending an outgoing video stream 250 and receiving a seamless virtual circular video stream 240 containing a portion of the outgoing video stream 250, such as to allow time for transmission and processing operations. In some embodiments, a portion of the outgoing video stream 250 may be extracted and combined with video streams from other clients to form the seamless virtual circular video stream.

In some embodiments, a virtual circular image may be a view of a virtual room. The view of the virtual room may comprise a panoramic view, such as a seamless panoramic view offering a full 360 degrees of visibility, such that no seam appears in a complete circular view of the panorama. In some embodiments, portions of the outgoing video stream 250 may be contained in the received seamless virtual circular video stream 240 such that the video information of the participant appears in the virtual room. In some embodiments, the virtual room may be a virtual conference room, such that a virtual circular image has the appearance of a conference in which the participants are seated around a table, or some other desired contextual setting (e.g., home, office, beach, etc.).

In some embodiments, display operations for a virtual circular image may be customized or controlled by the client, user, or participant in the conference. The display module 220 may be operative to display the virtual circular image with a starting and ending degree determined by the client, user, or participants. The display module 220 may be operative to pan or zoom the virtual circular image. As such, the display module 220 may be operative to allow the client, user, or participant to determine their individual viewpoint a virtual room. This may allow for a more complete simulation of a virtual room, such that the user has a viewing experience more similar to a conference in a physical room containing other physical participants.

Figure 3:
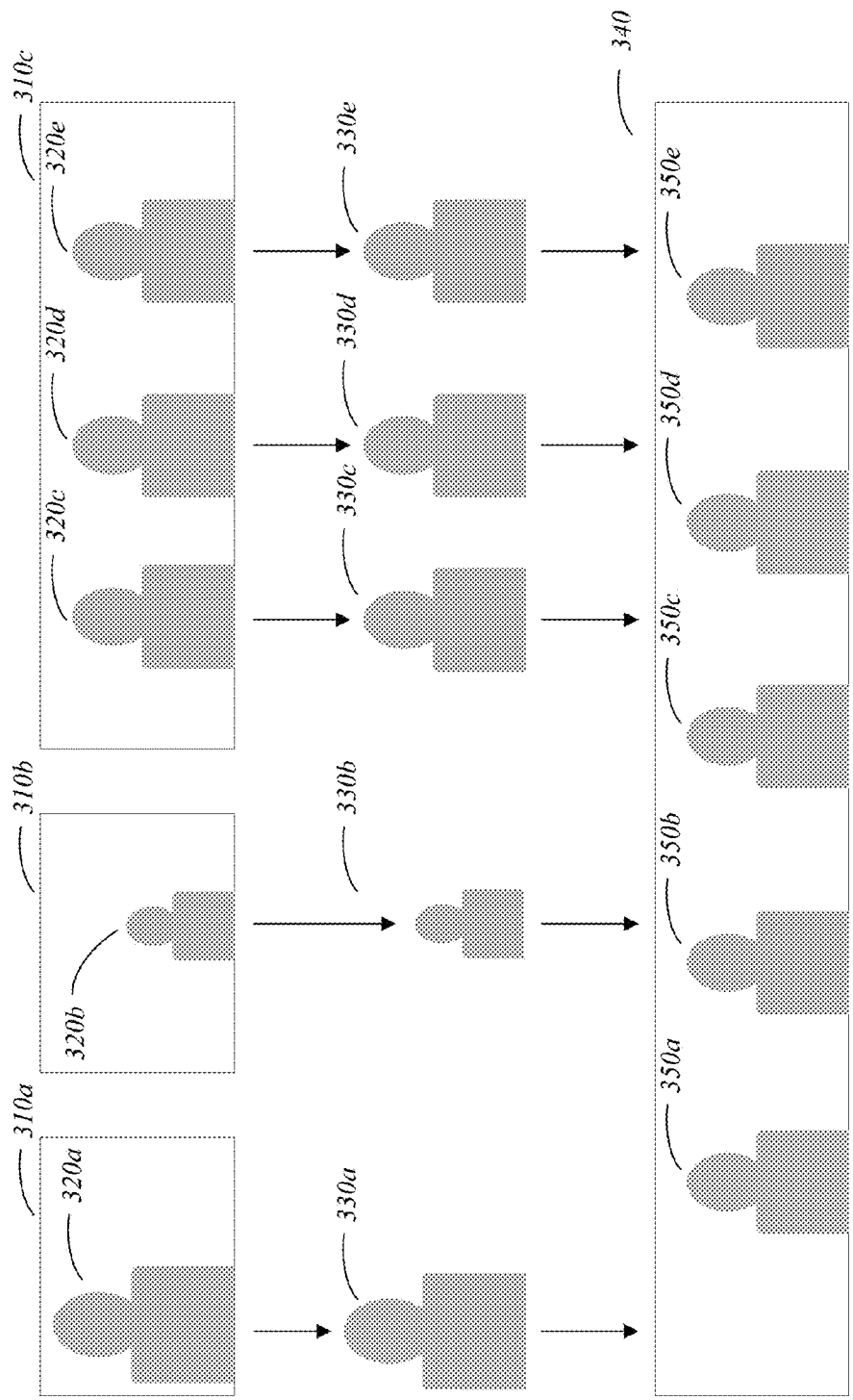
FIG. 3 depicts an exemplary flowchart of a process for extracting and compositing visual information from a plurality of received video streams.

FIG. 3 depicts an exemplary flowchart of a process for extracting and compositing visual information from a plurality of received video streams 310-c, which are representative of the incoming video streams 160-a of FIG. 1. Video streams 310-1, 310-2, and 310-3 may comprise three such incoming video streams. Video stream 310-1 contains video information for a single participant 320-1, and, in one example, may correspond to a video stream of an employee individually participating in a conference from their office. Video stream 310-2 contains video information for a single participant 320-1, and, in one example, may correspond to a video stream of an employee individually participating in a conference from a home office. Video stream 310-3 is a panoramic video stream containing three participants, 320-1, 320-2, and 320-3, which, in one example, may correspond to three employees participating in the conference from a conference room containing a panoramic camera.

In various embodiments, visual information, portions of the video stream, may be extracted from each of the video streams 310-1, 310-2, and 310-3. For the individual video streams 310-1, 310-2, this may correspond to extracting from each of the video streams 310-1, 310-2 the video information 330-1, 330-2, each of which corresponds to the images of the respective participants 320-1, 320-2. For the panoramic video stream 310-3, this may correspond to generating a plurality of video sub-streams 162-b, each corresponding to a single participant, and extracting from the video sub-streams 162-b the video information 330-3, 330-4, and 330-5, which corresponds to the images of the participants from the respective sub-streams 162-b. In an alternative embodiment, the video information 330-3, 330-4, and 330-5 may be directly extracted from the panoramic video stream 310-3 without creating video sub-streams 162-b.

Once extracted, the video information 330-1, 330-2, 330-3, 330-4 and 330-5 may be composited together in a single composition. In some embodiments, composition operations may comprise compositing the participants into a virtual room 340, such as a virtual conference room. In some embodiments, compositing operations may include resizing the participants to a similar size in the virtual room, as indicated for the participant 320-2 and corresponding video information 330-2. Such resizing may be necessary as, in some situations, a participant may be farther or closer to their camera than other participants, may have differing video equipment providing a different field of view than other participants, or may otherwise have a different absolute size in their video stream than other participants. In some embodiments, a panoramic view 340 of the virtual room may be generated, which may be a panoramic view providing a full 360 degrees of visibility, such that no seam appears in a complete circular view of the panorama.

Figure 4:
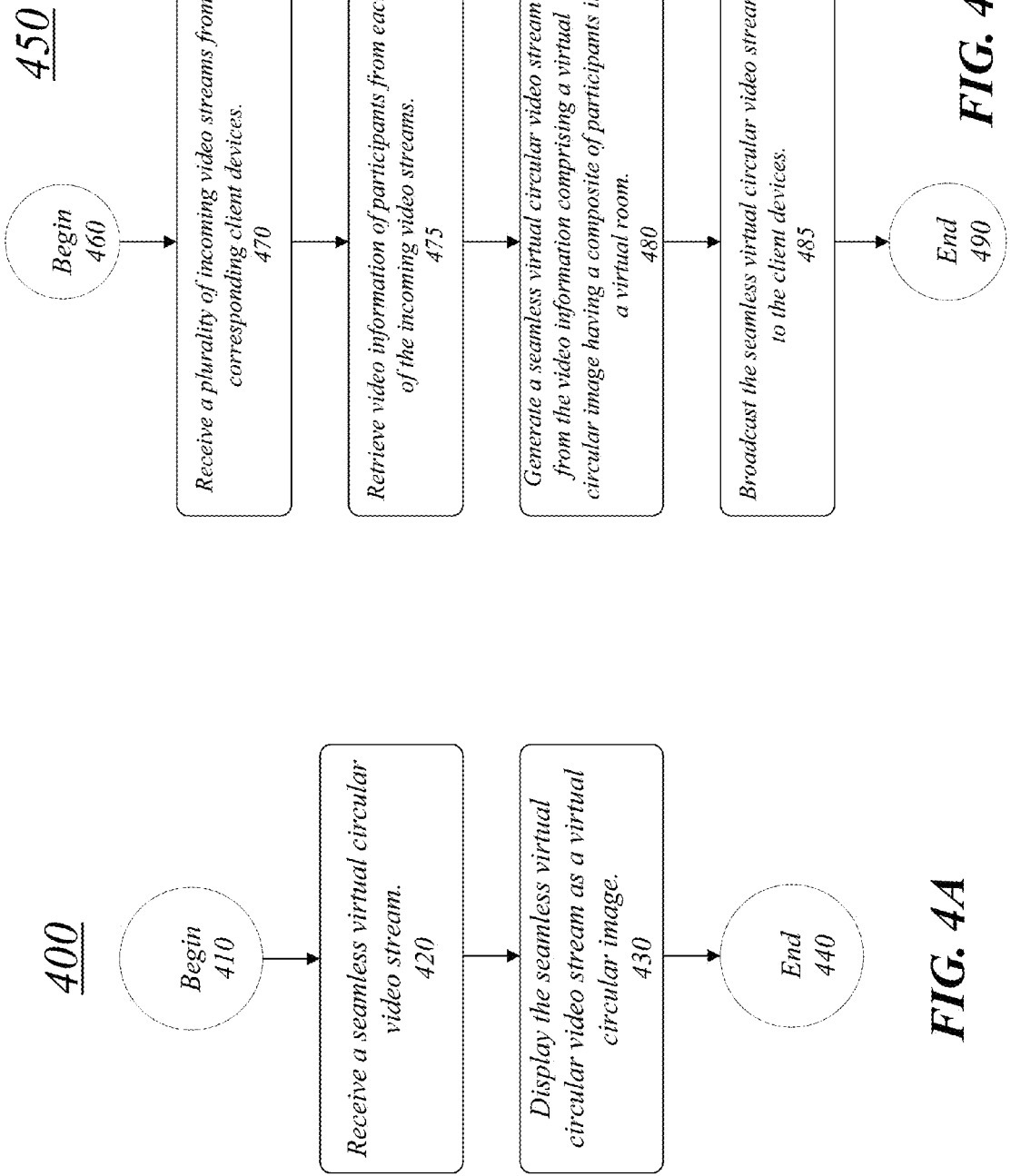
FIG. 4A depicts a logic flow suitable for participating in a virtual circular conferencing experience.
FIG. 4B depicts a logic flow suitable for hosting a virtual circular conferencing experience.

FIG. 4A depicts a logic flow 400 suitable for participating in a virtual circular conferencing experience. Although specific operations are disclosed in logic flow 400, such operations are exemplary. That is, various embodiments of the present technology are well suited to performing various other operations or variations of the operations recited in logic flow 400. It is appreciated that the operations in logic flow 400 may be performed in an order different than presented, and that not all of the operations in logic flow 400 may be performed.

The operations recited in logic flow 400 may be embodied as computer-readable and computer-executable instructions that reside, for example, in data storage features such as a computer usable volatile memory, a computer usable non-volatile memory, and/or data storage unit. The computer-readable and computer-executable instructions may be used to control or operate in conjunction with, for example, a processor and/or processors. Although the specific operations disclosed in logic flow 400 may be embodied as such instructions, such operations are exemplary. That is, the instructions may be well suited to performing various other operations or variations of the operations recited in logic flow 400. It is appreciated that instructions embodying the operations in logic flow 400 may be performed in an order different than presented, and that not all of the operations in logic flow 400 may be performed.

In operation 410, the method begins.

In operation 420, a seamless virtual circular video stream is received. For example, assume for the purposes of illustration that the seamless virtual circular video stream 240 is received by an appropriate interface of the communications module 210 of the conferencing client 200 from a conferencing system 100 for display to a conferencing participant.

In operation 430, the seamless virtual circular video stream is displayed as a virtual circular image. For example, the display module 220 may display the virtual circular image. In some embodiments, the display of the virtual circular image may be customized or controlled by the client, user, or participant in the conference. The display may be operative to display the virtual circular image with a starting and ending degree determined by the client, user, or participant. The display may be operative to be panned or zoomed.

In operation 440, the method stops.

FIG. 4B depicts a logic flow 450 suitable for hosting a virtual circular conferencing experience. Although specific operations are disclosed in logic flow 450, such operations are exemplary. That is, various embodiments of the present technology are well suited to performing various other operations or variations of the operations recited in logic flow 450. It is appreciated that the operations in logic flow 450 may be performed in an order different than presented, and that not all of the operations in logic flow 450 may be performed.

The operations recited in logic flow 450 may be embodied as computer-readable and computer-executable instructions that reside, for example, in data storage features such as a computer usable volatile memory, a computer usable non-volatile memory, and/or data storage unit. The computer-readable and computer-executable instructions may be used to control or operate in conjunction with, for example, a processor and/or processors. Although the specific operations disclosed in logic flow 450 may be embodied as such instructions, such operations are exemplary. That is, the instructions may be well suited to performing various other operations or variations of the operations recited in logic flow 450. It is appreciated that instructions embodying the operations in logic flow 450 may be performed in an order different than presented, and that not all of the operations in logic flow 450 may be performed.

In operation 460, the method begins.

In operation 470, a plurality of incoming video streams from corresponding client devices is received. For example, assume for the purposes of illustration that the incoming video streams 160-a are received by an appropriate interface of the communications module 110 of the conferencing system 100. In some embodiments, at least one of the plurality of incoming video streams may comprise a panoramic video stream, which may comprise an approximately 360-degree video stream of a conference room.

In operation 475, video information of participants is retrieved from each of the incoming video streams. For example, the multimedia controller 120 may retrieve the video information. In some embodiments, the retrieved video information may contain only those portions of the incoming video streams which correspond to the participants from each of the video streams. In some embodiments, the retrieved video information may additionally be retrieved from a plurality of video sub-streams created by dividing a panoramic video stream into sub-streams such that each sub-stream contains one participant.

In operation 480, a seamless virtual circular video stream is generated from the video information comprising a virtual circular image having a composite of the participants in a virtual room. For example, the multimedia controller 120 may composite the participants and generates the video information. In some embodiments, the virtual room may comprise a three-dimensional virtual space. In some embodiments, the multimedia controller 120 may resize the participants from the incoming video streams to a similar size in the virtual room.

In operation 485, the seamless virtual circular video stream is broadcasted to the client devices. For example, communications module 110 may broadcast outgoing video stream 170, where outgoing video stream 170 is the virtual circular video stream.

In operation 490, the method stops.

Figure 5:
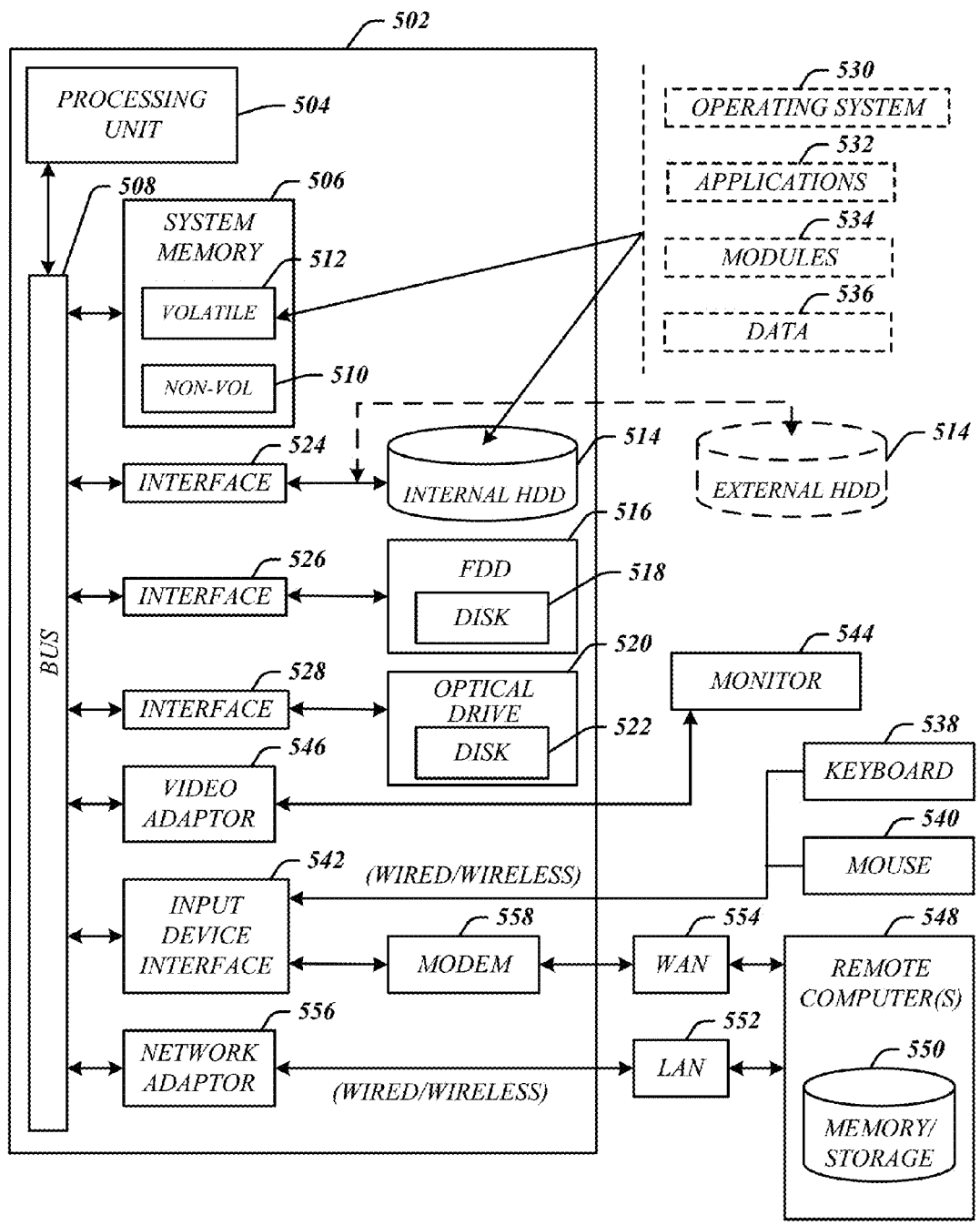
FIG. 5 depicts an exemplary diagram of a computing system according to one embodiment of the present technology.

FIG. 5 illustrates an embodiment of an exemplary computing architecture 500 suitable for implementing various embodiments as previously described. The computing architecture 500 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 500.

As shown in FIG. 5, the computing architecture 500 comprises a processing unit 504, a system memory 506 and a system bus 508. The processing unit 504 can be any of various commercially available processors. Dual microprocessors and other multi-processor architectures may also be employed as the processing unit 504. The system bus 508 provides an interface for system components including, but not limited to, the system memory 506 to the processing unit 504. The system bus 508 can be any of several types of bus structure that may further interconnect to a memory bus (with or without a memory controller), a peripheral bus, and a local bus using any of a variety of commercially available bus architectures.

The system memory 506 may include various types of memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 5, the system memory 506 can include non-volatile memory 510 and/or volatile memory 512. A basic input/output system (BIOS) can be stored in the non-volatile memory 510.

The computer 502 may include various types of computer-readable storage media, including an internal hard disk drive (HDD) 514, a magnetic floppy disk drive (FDD) 516 to read from or write to a removable magnetic disk 518, and an optical disk drive 520 to read from or write to a removable optical disk 522 (e.g., a CD-ROM or DVD). The HDD 514, FDD 516 and optical disk drive 520 can be connected to the system bus 508 by a HDD interface 524, an FDD interface 526 and an optical drive interface 528, respectively. The HDD interface 524 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 510, 512, including an operating system 530, one or more application programs 532, other program modules 534, and program data 536. The one or more application programs 532, other program modules 534, and program data 536 can include, for example, the conferencing system 100 or conferencing client 200, the communications module 110, the multimedia controller 120, the stream division module 130, the tracking module 140, the communications module 210, or the display module 220.

A user can enter commands and information into the computer 502 through one or more wire/wireless input devices, for example, a keyboard 538 and a pointing device, such as a mouse 540. Other input devices may include a microphone, an infra-red (IR) remote control, a joystick, a game pad, a stylus pen, touch screen, or the like. These and other input devices are often connected to the processing unit 504 through an input device interface 542 that is coupled to the system bus 508, but can be connected by other interfaces such as a parallel port, IEEE 1394 serial port, a game port, a USB port, an IR interface, and so forth.

A monitor 544 or other type of display device is also connected to the system bus 508 via an interface, such as a video adaptor 546. In addition to the monitor 544, a computer typically includes other peripheral output devices, such as speakers, printers, and so forth.

The computer 502 may operate in a networked environment using logical connections via wire and/or wireless communications to one or more remote computers, such as a remote computer 548. The remote computer 548 can be a workstation, a server computer, a router, a personal computer, portable computer, microprocessor-based entertainment appliance, a peer device or other common network node, and typically includes many or all of the elements described relative to the computer 502, although, for purposes of brevity, only a memory/storage device 550 is illustrated. The logical connections depicted include wire/wireless connectivity to a local area network (LAN) 552 and/or larger networks, for example, a wide area network (WAN) 554. Such LAN and WAN networking environments are commonplace in offices and companies, and facilitate enterprise-wide computer networks, such as intranets, all of which may connect to a global communications network, for example, the Internet.

When used in a LAN networking environment, the computer 502 is connected to the LAN 552 through a wire and/or wireless communication network interface or adaptor 556. The adaptor 556 can facilitate wire and/or wireless communications to the LAN 552, which may also include a wireless access point disposed thereon for communicating with the wireless functionality of the adaptor 556.

When used in a WAN networking environment, the computer 502 can include a modem 558, or is connected to a communications server on the WAN 554, or has other means for establishing communications over the WAN 554, such as by way of the Internet. The modem 558, which can be internal or external and a wire and/or wireless device, connects to the system bus 508 via the input device interface 542. In a networked environment, program modules depicted relative to the computer 502, or portions thereof, can be stored in the remote memory/storage device 550. It will be appreciated that the network connections shown are exemplary and other means of establishing a communications link between the computers can be used.

The computer 502 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 6:
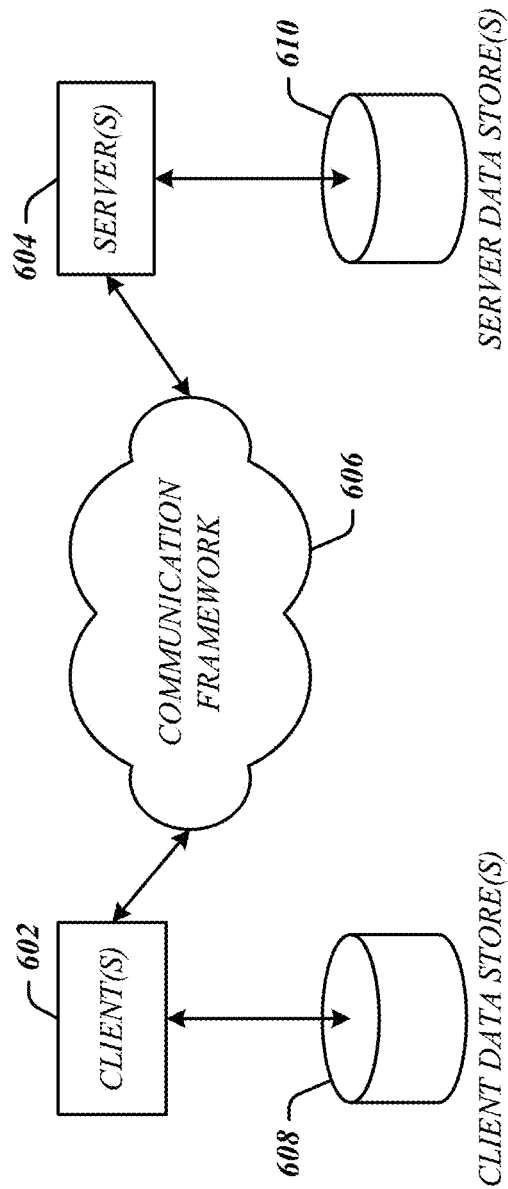
FIG. 6 depicts an exemplary diagram of a communications system according to one embodiment of the present technology.

FIG. 6 illustrates a block diagram of an exemplary communications architecture 600 suitable for implementing various embodiments as previously described. The communications architecture 600 includes various common communications elements, such as a transmitter, receiver, transceiver, radio, network interface, baseband processor, antenna, amplifiers, filters, and so forth. The embodiments, however, are not limited to implementation by the communications architecture 600.

As shown in FIG. 6, the communications architecture 600 comprises includes one or more clients 602 and servers 604. The clients 602 may host the clients of the present technology, and may comprise the conferencing client 200 of the present technology. The servers 604 may implement the conferencing system 100. The clients 602 and the servers 604 are operatively connected to one or more respective client data stores 608 and server data stores 610 that can be employed to store information local to the respective clients 602 and servers 604, such as cookies and/or associated contextual information.

The clients 602 and the servers 604 may communicate information between each other using a communication framework 606. The communications framework 606 may implement any well-known communications techniques, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The clients 602 and the servers 604 may include various types of standard communication elements designed to be interoperable with the communications framework 606, such as one or more communications interfaces, network interfaces, network interface cards (NIC), radios, wireless transmitters/receivers (transceivers), wired and/or wireless communication media, physical connectors, and so forth. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. One possible communication between a client 602 and a server 604 can be in the form of a data packet adapted to be transmitted between two or more computer processes. The data packet may include a cookie and/or associated contextual information, for example.

Various embodiments may be implemented using hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may comprise an article of manufacture. An article of manufacture may comprise a computer-readable storage medium arranged to store logic. Examples of a computer-readable storage media include any storage medium capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus, comprising:
  a communications module operative to receive a plurality of incoming video streams from corresponding client devices for a conference call with at least one of the plurality of incoming video streams comprising a panoramic video stream;
  a multimedia controller operative to retrieve video information of participants from the at least one of the plurality of incoming video streams comprising the panoramic video stream, and generate a seamless virtual circular video stream of a seamless panoramic view of a virtual space comprising a virtual circular image having a composite of participants; and
  the communications module operative to broadcast the seamless virtual circular video stream to the client devices.

2. The apparatus of claim 1 further comprising a stream division module operative to divide the panoramic video stream into multiple video sub-streams, and wherein the multimedia controller operative to extract the video information from the multiple video sub-streams.

3. The apparatus of claim 2, the panoramic video stream comprising an approximately 360-degree video stream of a conference room.

4. The apparatus of claim 2, the multimedia controller operative to combine the multiple video sub-streams and the remaining incoming video streams into the seamless virtual circular video stream.

5. The apparatus of claim 4, comprising a tracking module operative to identify participants in the panoramic video stream and the stream division module operative to divide the panoramic video stream on the basis of the identified participants.

6. The apparatus of claim 1, the retrieved video information containing only those portions of the incoming video streams which correspond to the participants from each of the video streams.

7. The apparatus of claim 1, the multimedia controller operative to resize the participants from the incoming video streams to a similar size in a virtual room.

8. The apparatus of claim 1, wherein the multimedia controller operative to composite the video information of the participants into a pseudo-three dimensional virtual space using a two-dimensional image as a background and three-dimensional structures for elements in the pseudo-three dimensional virtual space.

9. An article comprising a storage medium containing instructions that when executed enable a system to:
 send an outgoing video stream from a conferencing client to the conferencing server;
 receive a seamless virtual circular video stream broadcasted from a conferencing server comprising a portion of the outgoing video stream, the seamless virtual circular video stream of a seamless panoramic view of a virtual space comprising a virtual circular image having a composite of participants; and
 present the virtual circular image on a display.

10. The article of claim 9, the received seamless virtual circular video stream comprising an approximately 360-degree video stream of a conference room.

11. The article of claim 9, further comprising instructions that when executed enable the system to display the virtual circular image with a starting and ending degree determined by the client.

12. The article of claim 9, further comprising instructions that when executed enable the system to pan the virtual circular image.

13. The article of claim 9, further comprising instructions that when executed enable the system to zoom the virtual circular image.

14. A computer-implemented method, comprising:
 receiving a plurality of incoming video streams from corresponding client devices for a conference call with at least one of the plurality of incoming video streams comprising a panoramic video stream;
 retrieving video information of participants from the at least one of the plurality of incoming video streams comprising the panoramic video stream; and
 broadcasting, to the client devices, a seamless virtual-circular video stream of a seamless panoramic view of a virtual space comprising a virtual circular image having a composite of participants.

15. The method of claim 14 further comprising dividing the panoramic video stream into multiple video sub-streams and extracting the video information from the multiple video sub-streams.

16. The method of claim 14 further comprising using a two-dimensional image as a background and three-dimensional structures for elements in a pseudo-three dimensional virtual space to composite the video information of the participants into the pseudo-three dimensional virtual space.

17. The method of claim 14 further comprising extracting the video information to isolate a participant to a video sub-stream.

18. The method of claim 14 further comprising resizing the video information of the participants to a size determined by attributes of a virtual room.

19. The apparatus of claim 1, wherein the multimedia controller operative to resize the video information of the participants to a size determined by attributes of a virtual room.

20. The apparatus of claim 1, wherein the multimedia controller operative to extract the video information to isolate a participant to a video sub-stream.

\* \* \* \* \*